Aug. 6, 1946.                    A. HAVEL                    2,405,304
                    LAGGING AND METHOD OF MAKING THE SAME
                            Filed Nov. 15, 1941
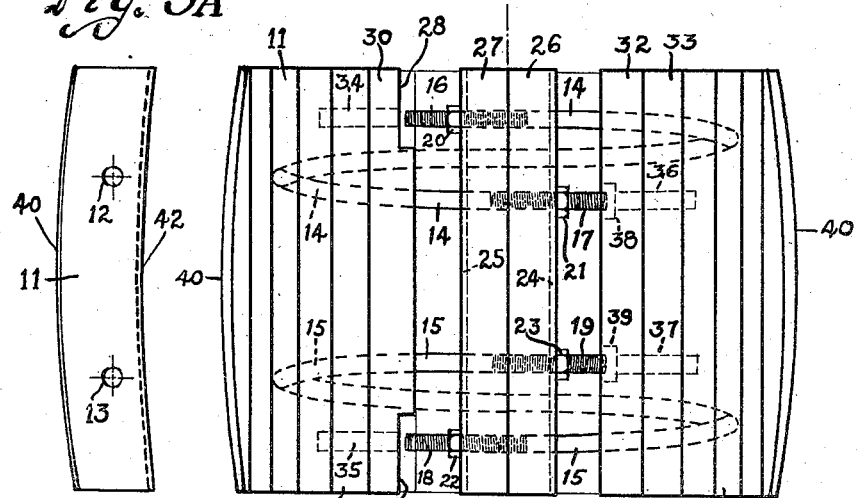
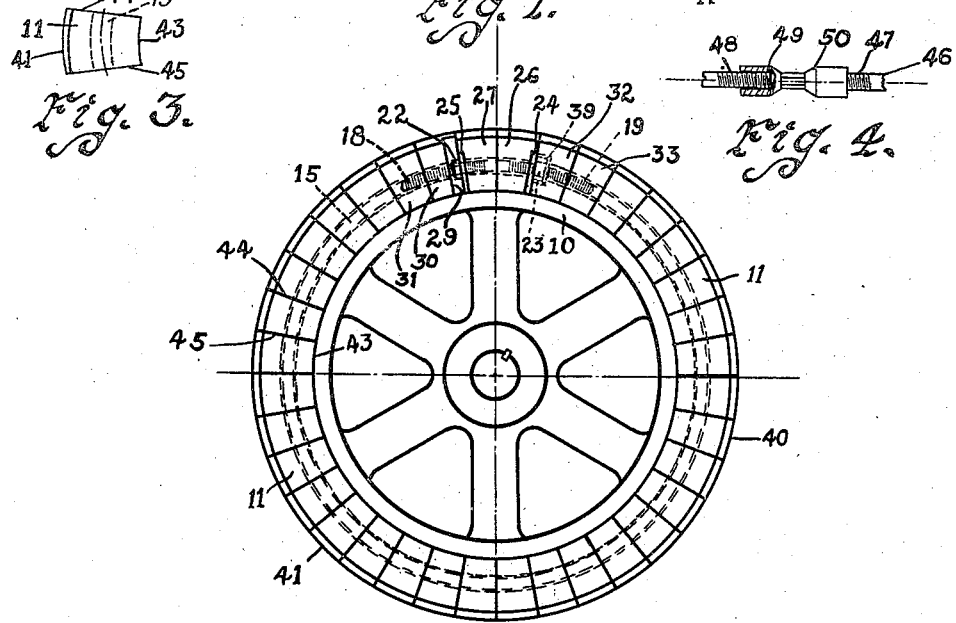
ARTHUR HAVEL
INVENTOR.
BY Dick and Bailey Patented Aug. 6, 1946

2,405,304

UNITED STATES PATENT OFFICE 2,405,304

LAGGING AND METHOD OF MAKING THE SAME

Arthur Havel, Ainsworth, Iowa

Application November 15, 1941, Serial No. 419,297

7 Claims. (Cl. 74—230.18)

This invention relates to pulleys and is more specifically concerned with means for regulating or varying the size of the circumference of pulleys as for altering the power and speed which they transmit or receive as the case may be.

It is a well known principle and fact that when a driving pulley and a driven pulley are operatively connected by means of a belt the speed of rotation of the driven pulley may be increased and its power decreased either by decreasing its size or by increasing the size of the driving pulley. Conversely, the speed of the driven pulley may be decreased and its power increased by increasing its size or by decreasing the size of the driving pulley. However, most belt driven machinery comes equipped with only one pulley for delivering or taking belt power. Of course it is possible to remove the installed pulley from the pulley shaft of a machine and to replace it with a pulley of different size but this solution is objectionable from at least two standpoints. For one thing the heavy, large-size pulleys which are normally involved are expensive items so that owning a number of pulleys requires that the individual have considerable money invested. This aspect is augmented by the fact that pulley shafts of different machines vary in size making it impossible in many instances to use a pulley of given outside circumference on more than one machine due to the fact that its central bearing is not of proper size for other machines. Also removing and replacing pulleys on their shafts is no inconsequential task for they are commonly secured thereon by means of wedged keys or other means difficult to disengage.

In order to eliminate the necessity for changing the pulley to secure variation in the size of its outer circumference, devices have been proposed for building up the exterior peripheries of pulleys. Among such devices hitherto known is a fiber sheet construction intended to be attached to the pulley by means of clamps or other suitable devices. These fiber devices however, have proven unsuccessful for a number of reasons and the same is true of most, if not all, other pulley size regulators heretofore available.

It is an object of this invention to provide a highly successful means for altering the outer circumferential size of pulleys.

Another object of this invention is to provide a device for increasing the outer circumference of pulleys which includes a plurality of blocks of suitable material operatively united.

Another object of this invention is to provide a device for altering the outer circumferential size of pulleys which may be readily installed and removed.

A further object of this invention is to provide a pulley size regulator which may be transferred from one pulley to another.

Yet another object of this invention is to provide a device for regulating pulley size which may be used upon pulleys of various original sizes.

An additional object is to provide a novel process for making a lagging.

A still further object of this invention is to provide a device of the type described which is economical in manufacture, simple in construction, and durable in use.

Broadly my invention consists in a plurality of blocks adapted to be distributed about the outer circumference of a pulley and to be operatively connected to said pulley. Preferably the blocks are threaded upon a suitable connecting member or upon suitable connecting members which extend about the pulley and are held in engagement with the pulley by means of the connecting member or members being so reduced in their circumferential size as to press the blocks snugly against the outer periphery of the said pulley.

In order that a clear and concise understanding of my invention may be had reference should be made to the accompanying drawing forming a part of this specification in which Fig. 1 is a top plan view of one form of my invention at a particular juncture in its revolution, certain of the blocks being spread apart to more clearly reveal the construction.

Fig. 2 is an end elevation of the device illustrated in Fig. 1 showing the same mounted on a pulley and with the block connecting members so tightened as to hold the blocks in operative engagement with said pulley.

Fig. 3 shows a side and an end view of one of the blocks employed in the construction shown in Figs. 1 and 2.

Fig. 3A is a side view of the block illustrated in Fig. 3.

Fig. 4 is a fragmentary side elevation of an alternative form of block connecter, a part being broken away to show the internal construction.

In the illustration of my invention which I have shown for purposes of explanation, I have used thirty-six individual blocks distributed about the outer circumference of the pulley 10. Most of these blocks are of uniform shape and size and have been designated by the reference character 11. A few of them are specially constructed and will subsequently be assigned separate numerals. All of the blocks, including those specially formed, are provided with holes 12 and 13 (Fig. 3) extending therethrough from side to side. Circular rods 14 and 15 are received in the holes 12 and 13 respectively of the various blocks, giving the block assembly a supported cylindrical shape as appears clearly in Fig. 2. The arrangement is such that the holes 12 in successive or adjacent blocks are off-set slightly from one another producing a generally spiral-shaped channel in the block assembly, thus permitting the circular rod 14 disposed therein to be correspondingly spiral in shape. By this construction the ends 16 and 17 of the rod 14 are spaced laterally from one another so that they do not meet in their co-extensive portions. A similar arrangement of the holes 13 prevents a meeting of the ends 18 and 19 of the rod 15. Using off-set holes in succeeding blocks to obtain the spiral design for the channels necessitates the holes being of slightly larger diameter than the rods which they receive in order to provide the space required for the angling direction of the rods within the holes. If desired the holes themselves may travel in an oblique path in which case they need be no larger than is necessary to receive a rod of the diameter used. On the other hand, the holes 12 and 13 may be slots elongated in the same direction as the blocks and to a sufficient extent to permit adequate lateral spacing of the ends of the respective rods. If the latter construction is employed and all blocks are provided with slots of ample length, there is no necessity for placing the ordinary blocks 11 in any particular order. Obviously, however, if the off-set hole or oblique hole arrangement be used, it is necessary that the blocks be assembled in a particular manner in order for a continuous spiral channel of adequate size to be provided. Each of the ends 16, 17, 18, and 19 of the rods 14 are threaded in the preferred form of my invention. Nuts 20, 21, 22, and 23 are provided on these threaded ends respectively. Metal plates 24 and 25 are provided in suitable recesses in opposite sidewalls of blocks 26 and 27 respectively to serve as abutments for the nuts 20, 21, 22, and 23. Cut-outs 28 and 29 are provided in the block 30 for permitting access to the nuts 20 and 22 respectively when my lagging is in compressed condition. As is apparent from Fig. 1 blocks 26 and 27 have four holes apiece rather than two and each of the rods 14 and 15 pass through these blocks at two points. Additional holes are also supplied in those blocks which are adjacent blocks 26 and 27, such as blocks 30 and 31 and blocks 32 and 33 to provide channels 34, 35, 36, and 37 for receiving respectively ends 16, 18, 17, and 19 when my lagging is in compressed condition. Enlarged shallow holes or countersinks 38 and 39 are provided for receiving the nuts 21 and 23 respectively when the device is compressed. As appears clearly in Fig. 3, each of the blocks, whether ordinary or of special construction is preferably crowned or convex in both a longitudinal direction as at 40 and in a transverse direction as at 41 on its outer face and is concave in both a longitudinal and transverse direction on its inner face as at 42 and 43 respectively. The sides of the blocks are preferably inclined as at 44 and 45 of Fig. 3. When using 36 blocks, as I have in the present embodiment of my invention, a perfectly formed cylinder may be produced by so forming the blocks that the angle of incline on each face of each block is precisely five degrees.

Assuming that at the outset the lagging is in its compressed state, the procedure in installing it upon a pulley is normally as follows: The nuts 20 and 22 are loosened on the ends 16 and 18 until it is possible to spread or expand the device sufficiently so that one of its ends will pass over the crown of the pulley. It will be obvious from what has been said heretofore and from Fig. 3 that the inner periphery of my lagging in its preferred form is more restricted at its ends than in its central portion. After an end of the lagging has passed the crown of the pulley the lagging is centered on the pulley so that the crown of the pulley is received in the concave portion of the inner periphery of the lagging. The nuts 20 and 22 are then re-tightened, drawing the lagging snugly about the pulley and placing it in non-slipping engagement therewith. These nuts may be tightened even after the blocks are all substantially in contact one with another by means of an end wrench or other suitable tool introduced into the cut-outs 28 and 29. Normally, the nuts 21 and 23 are not adjusted unless adjustment in addition to that provided by the nuts 20 and 22 is required. In that event the adjustment of the nuts 21 and 23 is made prior to compressing the lagging.

In making the lagging shown in Figs. 1 to 3, I prefer to pursue the following steps. Blocks are formed to the shapes and sizes desired including the provision of suitable holes therein and rods of appropriate length are threaded at each end. The rods are then bent into annular shapes of the diameters desired in view of the size of the lagging contemplated. Nuts 21 and 23 and plate 24 are next applied to corresponding ends of the rods. Blocks 26 and 27, plate 25, and blocks 30 and 31 are then placed on the rods after which the desired number of blocks 11 are threaded thereon, and finally the blocks 33 and 32 are added. The ends 16 and 18 of the rods are then extended through the outer pairs of holes in the blocks 26 and 27 and nuts 20 and 22 installed. Next nuts 21 and 23 are properly adjusted after which nuts 20 and 22 are tightened, compressing the lagging.

I may make numerous modifications of the precise construction which I have described. For example, Fig. 4 shows such a modification. In the connecting device there illustrated a circular rod 46 is employed, the ends of which are not necessarily at least, off-set laterally, and preferably the ends of said rod do not entirely reach one another. These ends 47 and 48 of said rod 46 are threaded and engage tapped holes, as at 49, in opposing ends of the link or turnbuckle 50. Rotation of the turnbuckle in one direction operates to compress the lagging; rotation in the other direction expands it. When using a turnbuckle it is, of course, necessary to provide an enlarged channel within the block assembly of sufficient size to receive said turnbuckle and permit its rotation. A cut-out of any suitable type, such for example as the cut-out 29 is supplied for providing access to the turnbuckle in order that it may be operated by a removable lever or other suitable device. If desired, a single rod, or other block connecter substituted in its stead, may be employed in place of the two rods. Obviously, a larger number of block connecters and their attachments may be used. If blocks of sufficient thickness are employed in the embodiment shown in Figs. 1 to 3, the ends of the connecter rod or rods may be prevented from meeting by means of spacing them at different distances outwardly from the pulley. It is immaterial whether the centrally located nuts 21 and 23 or the outer nuts 20 and 22 be designed to tighten the lagging about the pulley. If the centrally located nuts be used for this purpose, the cut-outs 28 and 29 may be centrally located in the proper block and need not open on its ends. They may, in fact, be one enlarged cut-out. The metal plates 24 and 25 may be eliminated or washers or short plates substituted in their stead. It is satisfactory to place the plates 24 and 25 or their substitutes upon either side of a single block rather than spacing them apart by two blocks. The threads on the ends 17 and 19 and the nuts 21 and 23 may be eliminated and any suitable adjustable or non-adjustable abutment or bearing be provided for holding these ends against substantial movement through the channels in the lagging. The sizes and shapes of the component blocks may be widely varied. For example, their inner faces need not be concave, nor are their outer faces necessarily convex. It is not absolutely essential that their sides be inclined. Again, the blocks against which the metal plates are pressed need not be recessed for receiving said plates. The cut outs may be varied, the countersinks 38 and 39 and the stub channels 36 and 39 may be altered or eliminated, and the other channels in the lagging may be varied widely. If desired the channel or channels need not be closed but may rather open, for instance, on the outer face of the lagging being in the nature of a circumferential groove or grooves in which the tie rods or their substitutes are received, there being means provided for tightening the tying means about the blocks to cause them to press snugly against the pulley. Any number of blocks may be used provided there is a sufficient quantity to satisfactorily cover the pulley and to provide an acceptable surface for engaging the belt. If the block connector or tie be of sufficient length, additional blocks may be inserted if it is desired to place the lagging about a larger size pulley provided, of course, that the added blocks are equipped with a suitable hole or holes or other channel or channels for receiving the connecter or connecters. However, the addition of auxiliary blocks when the device is being used on a larger pulley is not imperative, for the blocks originally present in the device may be simply spaced apart. If provision is made for extraordinary tightening of the connecter structure, the lagging may be used upon a pulley of smaller size than that for which it was originally intended by the removal of a block or blocks. Again, the lagging may be placed about a small size pulley and the space between the outer periphery of the pulley and the inner periphery of the lagging may be tightened. The extent to which my device increases the diameter of a pulley may be varied by regulation of the thickness of the component blocks. Any suitable connecter may be substituted for the rod device which I have shown. For example a cable or heavy wire, together with appropriate tightening means, may be used. The connecter structure may be operatively connected to the blocks in any manner adapted to enable it to retain the blocks in operative relationship with a pulley.

The lagging which I have shown may of course be used to increase the size of numerous devices other than pulleys and my novel process for preparing a lagging may be materially varied. For one thing, obviously it may be adapted to the preparation of laggings having only one connecter member and to those having a connecter of the type shown in Fig. 4 of the drawing. Again, the steps need not be executed in the precise order specified and certain of these steps may be eliminated. For example, the ends 17 and 19 need not be threaded if stops other than nuts are provided. A portion of the blocks may be placed on the rods over the ends 17 and 19, and the remainder over the ends 16 and 18 in which case the application of the plate 24 and nuts 21 and 23 may be among the last steps performed, rather than among the first. Obviously, too, the nuts 20 and 21 and plate 25 may be installed and all of the blocks applied over the ends 17 and 19; in that event it would be necessary to subsequently insert the ends 17 and 19 through the central pairs of openings in the blocks 26 and 27.

While I have shown my lagging as having a generally cylindrical shape, it may be of various shapes. For instance, it may be oblong. It is not essential to my invention that a non-continuous connecter be employed to provide ends capable of being moved relative to one another for the purpose of pressing the blocks against the pulley or other object which they surround. Any suitable means may be employed for causing the connecter to press the blocks against the object surrounded. In the ensuing claims the recitation of one of a given element is not intended to infer that no more may be present unless such is indicated.

While I have described a particular embodiment of my invention in detail and have mentioned certain modifications thereof, one skilled in the art will be able to make other modifications, and this without departing from the spirit and scope of my invention. I wish therefore to be limited herein only by the appended claims.

I claim:

1. A lagging comprising a multiplicity of blocks having tapered sides and adapted to form a generally cylindrical construction, a continuous channel in the cylindrical block assembly extending more than completely around the same and disposed between its inner and outer peripheries the overlapping portions being separated by block structure, a rod received in said channel and extending more than completely around the block assembly, means for holding one end of said rod against substantial movement through said channel in one direction, threads on the other end of said rod and a nut on the threaded end of said rod adapted to at least indirectly engage one of said blocks whereby movement of the threaded end of said rod in said channel is effected.

2. A lagging comprising a multiplicity of blocks having tapered sides and adapted to form a generally cylindrical construction, the forms of the component blocks being such that said cylindrical construction has a substantially regularly curved and centrally crowned outer periphery together with an approximately regularly curved and centrally recessed inner periphery, a continuous channel in this cylindrical block assembly extending more than completely around the same, disposed between said inner and outer peripheries and having one of its ends spaced further from an end of said cylinder than in the other of its ends, the transition being gradual, a rod received in said channel extending more than completely around the block assembly, abutment plates received by recesses on opposite sides of certain relatively adjacent blocks, a nut threaded onto one end of said rod adapted to engage one of said abutment plates, said nut being capable of being received by recess structure in the adjacent side of the proximate block whereby spacement of latter said block from the adjacent plate housing block is minimized, a nut threaded onto the other end of said rod adapted to engage the other said plate and a cut out in that block which is adjacent the plated face of the block housing said latter plate, whereby access may be had to said latter nut.

3. A lagging comprising a multiplicity of blocks having tapered sides and adapted to form a generally cylindrical construction, the forms of the component blocks being such that said cylindrical construction has a substantially regularly curved and centrally crowned outer periphery together with an approximately regularly curved and centrally recessed inner periphery, a continuous channel in this cylindrical block assembly extending more than completely around the same, disposed between said inner and outer peripheries and having one of its ends spaced further from an end of said cylinder than is the other of its ends, said ends being separated by block structure and the transition being gradual, a rod received in said channel extending more than completely around the block assembly, abutment plates received by recesses on opposite sides of certain relatively adjacent blocks, a nut threaded onto one end of said rod adapted to engage one of said abutment plates, said nut being capable of being received by recess structure in the adjacent side of the proximate block whereby spacement of latter said block from the adjacent plate housing block is minimized, a nut threaded onto the other end of said rod adapted to engage the other said plate and a cut-out in that block which is adjacent the plated face of the block housing said latter plate, whereby access may be had to said latter nut.

4. A lagging comprising a multiplicity of blocks having tapered sides and adapted to form a generally cylindrical construction, a continuous channel in this cylindrical block assembly extending more than completely around the same, disposed between the inner and outer peripheries thereof and having its overlapping ends spaced apart by block structure, the course of the channel being generally similar to that of a spiral, a rod received in said channel extending more than completely around the block assembly, holding means on one end portion of said rod adapted to at least indirectly engage a surface of one of said blocks to prevent said rod from moving through said channel in one direction, an abutment plate received by a recess on a face of another of said blocks, and a nut threaded onto the other end portion of said rod adapted to engage said plate, that block which is adjacent the plated face of the block housing said plate having a cut-out whereby access to said nut is provided.

5. In a lagging, a plurality of blocks fitted together to form a generally cylindrical construction and a continuous channel in said cylindrical block assembly extending more than completely around the same between its inner and outer peripheries and having its overlapping portions separated by block structure.

6. A lagging comprising a multiplicity of blocks having tapered sides and adapted to form a generally cylindrical construction, a continuous channel in the cylindrical block assembly extending more than completely around the same and disposed between its inner and outer peripheries, the overlapping portions being separated by block structure, a rod received in said channel and extending more than completely around the block assembly, means for holding one end of said rod against substantial movement through said channel in one direction, and means engaging the other end portion of said rod for causing relative motion of said latter end portion of said rod and the adjacent portion of the said channel.

7. A lagging comprising a multiplicity of blocks having tapered sides and adapted to form a generally cylindrical construction, one of said blocks being provided with a recess on one of its unexposed surfaces, a continuous channel in this cylindrical block assembly extending more than completely around the same, disposed between the inner and outer peripheries thereof and having its overlapping ends spaced apart by block structure, a rod received in said channel extending more than completely around the block assembly, holding means on one end portion of said rod adapted to at least indirectly engage a surface of one of said blocks to prevent said rod from moving through said channel in one direction, an abutment plate received in said recess of said recessed block, and a nut threaded onto the other end portion of said rod adapted to engage said abutment plate, that block which is adjacent the plated face of the block housing said plate having a cut-out whereby access to said nut is provided.

ARTHUR HAVEL.